US012722219B2

(12) United States Patent
Hereth

(10) Patent No.: US 12,722,219 B2
(45) Date of Patent: Sep. 1, 2026

(54) REAMER FOR MACHINING OF THROUGH-HOLES

(71) Applicant: KENNAMETAL INC., Latrobe, PA (US)

(72) Inventor: Roland Hereth, Vohenstrauss (DE)

(73) Assignee: KENNAMETAL INC., Latrobe, PA (US)

( * ) Notice: Subject to any disclaimer, the term of this patent is extended or adjusted under 35 U.S.C. 154(b) by 408 days.

(21) Appl. No.: 18/240,929

(22) Filed: Aug. 31, 2023

(65) Prior Publication Data

US 2024/0082933 A1 Mar. 14, 2024

(30) Foreign Application Priority Data

Sep. 12, 2022 (DE) ........................ 102022123199.2

(51) Int. Cl.
*B23D 77/00* (2006.01)

(52) U.S. Cl.
CPC ...... *B23D 77/006* (2013.01); *B23D 2277/205* (2013.01); *B23D 2277/30* (2013.01)

(58) Field of Classification Search
CPC .......... B23D 7/00; B23D 7/003; B23D 7/006; B23D 2277/10; B23D 2277/205; B23D 2277/26; B23D 2277/28; B23D 2277/30; B23D 2277/32; B23D 2277/44; B23D 2277/60; B23D 2277/62
See application file for complete search history.

(56) References Cited

U.S. PATENT DOCUMENTS 1,399,142 A * 12/1921 Miller .................... B23D 77/02 408/229
2,795,979 A * 6/1957 Zerwick .................. B23B 51/10 408/229
4,050,840 A * 9/1977 Skingle .................. B23D 77/08 407/53
7,207,752 B2 * 4/2007 Schulte .................. B23D 77/00 408/1 R
7,625,161 B1 * 12/2009 Ruy Frota de Souza .................. B23B 51/06 407/34
9,168,601 B2 * 10/2015 Ning ...................... B23D 77/02
9,902,002 B2 * 2/2018 Ning .................... B23D 77/006
9,999,935 B2 * 6/2018 Kopton .................. B23D 77/14
(Continued)

FOREIGN PATENT DOCUMENTS

CN 208195827 U 12/2018
CN 113814473 A * 12/2021 ........... B23D 77/006
(Continued)

*Primary Examiner* — Jennifer H Gay
(74) *Attorney, Agent, or Firm* — Christopher J. Owens

(57) ABSTRACT

The invention relates to a reamer for machining through-holes, having a base body comprising a clamping region as well as a front-facing machining region with cutting elements, wherein the machining region comprises front-facing chip chambers and regions that are relief-ground on a circular cylindrical lateral surface defining the maximum radial dimension of the reamer in the machining region, which relief-ground regions are spaced apart from the perforated wall in a circular cylindrical through-hole, wherein the chip chambers and adjacent relief-ground regions are separated from one another by lateral surface portions.

18 Claims, 1 Drawing Sheet

(56) References Cited

U.S. PATENT DOCUMENTS 10,131,008 B2 * 11/2018 Hodza .................... B23D 77/02
10,857,606 B2 * 12/2020 Kress ..................... B23D 77/00
11,198,187 B2 * 12/2021 Okamoto ............. B23D 77/006
11,660,691 B2 * 5/2023 Yamada ................. B23D 77/00 408/144
11,724,323 B2 * 8/2023 Tanaka ................... B23D 77/02 408/229
12,420,346 B2 * 9/2025 Kauper ................ B23D 77/006
2005/0169721 A1 * 8/2005 Schulte ................ B23D 77/006 408/227
2005/0283160 A1 12/2005 Knisely et al.
2009/0053001 A1 2/2009 Cohen
2009/0110503 A1 4/2009 Shaheen
2010/0143055 A1 6/2010 Kleiner et al.
2010/0247257 A1 9/2010 Paul et al.
2012/0121344 A1 5/2012 Schuffenhauer et al.
2012/0121352 A1 * 5/2012 Ning ...................... B23D 77/02 408/229
2013/0115017 A1 * 5/2013 Schanz ................ B23D 77/006 408/229
2016/0082535 A1 * 3/2016 Ning ...................... B23D 77/00 408/230
2016/0263685 A1 * 9/2016 Hodza ....................... B24B 3/18
2017/0216945 A1 * 8/2017 Kopton .................. B23D 77/14
2020/0055125 A1 * 2/2020 Schulte ................... B23B 51/00
2020/0238409 A1 * 7/2020 Kress ..................... B23D 77/00
2021/0060675 A1 * 3/2021 Okamoto ............. B23D 77/006
2021/0245276 A1 * 8/2021 Tanaka ................... B23D 77/02
2022/0048125 A1 * 2/2022 Yamada ................. B23D 77/00
2023/0302556 A1 * 9/2023 Kauper ................ B23D 77/006
2024/0082933 A1 * 3/2024 Hereth ................. B23D 77/006
2025/0367742 A1 * 12/2025 Kauper ................ B23D 77/006

FOREIGN PATENT DOCUMENTS

CN 112839763 B * 12/2023 ........... B23D 77/006
CZ 201800353 A3 * 8/2019 ............. B23D 7/025
DE 10348061 A1 5/2005
DE 102010021089 A1 * 1/2012 ............. B23C 5/282
DE 102012216128 A1 3/2014
DE 102019133727 B3 1/2021
DE 102019209053 B4 * 7/2023 ............. B23D 77/02
GB 1506326 A * 4/1978 ............. B23D 77/08
JP H10310816 A 11/1998
WO WO-2017167984 A1 * 10/2017 ............. B23D 77/00
WO WO-2020080397 A1 * 4/2020 ........... B23D 77/006
WO 2022039258 A1 2/2022

* cited by examiner

REAMER FOR MACHINING OF THROUGH-HOLES

RELATED APPLICATION DATA

The present application claims priority under 35 U.S.C. § 119 to German Patent Application No. 102022123199.2, filed on Sep. 12, 2022, the disclosure of which is incorporated by reference herein in its entirety.

FIELD

The invention relates to a reamer for the machining of through-holes.

BACKGROUND

Reamers are typically used for fine machining of bores and/or holes, particularly through-holes, in order to achieve high surface quality as well as shape and dimensional accuracy of the perforated wall.

However, when reaming with the reamer, there can be chips that pass between the circumferential surface of the reamer and the perforated wall. This can result in the formation of scratches and/or scoring in the perforated wall, or even jamming of the reamer.

The problem addressed by the invention is to provide a reamer that prevents or at least reduces these problems by way of a skillful geometric design.

SUMMARY

According to the present invention, the problem is solved by a reamer for the machining of through-holes, with a base body comprising a clamping region and a front-side machining region with cutting elements. The machining region comprises front-facing chip chambers. Furthermore, the machining region comprises regions that are relief-ground on a circular cylindrical lateral surface defining the maximum radial dimension of the reamer in the machining region, which relief-ground regions are spaced apart from the perforated wall in a circular cylindrical through-hole. The chip chambers and adjacent relief-ground regions are thereby separated from one another by lateral surface portions.

The basic idea of the invention is to reduce the circumferential surface of the reamer that is in contact with the perforated wall when reaming by providing relief-ground regions while geometrically separating the relief-ground regions from the chip chambers. The separation is carried out by the lateral surface portions provided between the chip chambers and the relief-ground regions, which, by contact with the perforated wall, prevent chips from passing from the chip chambers into the relief-ground regions during machining of workpieces. The distance of the relief-ground regions from the perforated wall can also be expressed by using a circular cylindrical encasement end of the reamer instead of the perforated wall, by way of comparison. In the reamer according to the invention, the chips will fall axially downward through the through-hole.

This prevents or at least reduces scratches and/or scoring in the perforated wall and increases the surface quality of the reamed perforated wall.

It can be provided that the lateral surface portions separating the chip chambers and the relief-ground regions from one another are L-shaped.

Preferably, the L-shaped lateral surface portions each comprise a first leg arranged axially between a chip chamber and a relief-ground region. The first leg abuts the perforated wall when the reamer is used, thereby preventing chips from passing from the chip chambers into the relief-ground regions.

Furthermore, it can be provided that the L-shaped lateral surface portions of the reamer each have a second leg arranged in the circumferential direction between two relief-ground regions. The rotational movement of the reamer can be stabilized by the second legs, which also abut against the perforated wall when the reamer is used. In addition, by means of the second legs, it is prevented that chips enter the relief-ground regions by circumferential relative movement with respect to the reamer.

One aspect of the invention provides that the first legs each have a respective length in the circumferential direction of the base body and a respective width in the axial direction of the base body, wherein the respective length is at least two times greater than the respective width. It has been shown that by means of this geometric design, it can effectively be prevented that chips pass from the chip chambers into the relief-ground regions.

Alternatively or additionally, it can be provided that the first legs are arranged on a line circumferentially surrounding the base body, wherein at least 50% of the line length of the first legs is occupied. The first legs arranged along the circumferential line form a barrier for chips. By ensuring that at least 50% of the line length, preferably more than 60% of the line length, is occupied by the first legs, an axial chipping movement towards the already reamed perforated wall is prevented. Due to the large contact length of the reamer with the perforated wall along the circumferential line in comparison to the prior art, particularly smooth surfaces can be produced by reaming with the reamer.

It is further provided that the reamer comprises coolant supply channels which are arranged circumferentially and extend in the axial direction of the base body, respectively bounded on a circumferential side by a second leg and abutting a relief-ground region on the other circumferential side.

Through these, coolant can pass into the chip chambers, in particular into a machining region, and can absorb and dissipate frictional heat there as well as flush the chips through the through-hole.

Preferably, the relief-ground regions abut the coolant supply channels in the cutting rotation direction. The second legs bound the coolant supply channels counter to the cutting rotation direction.

This arrangement prevents chips from passing through the coolant supply channels into the relief-ground regions.

In one embodiment of the invention, in order to be able to direct coolant into the coolant supply channels in a technically simple manner, it is provided that the coolant supply channels each have at least one coolant inlet. Through the coolant inlet, coolant introduced into the reamer from the base body can enter the respective coolant supply channel via the tool shaft.

In a preferred embodiment, each chip chamber is bounded by a cutting edge in sections, wherein the cutting edge extends up to the outer circumference.

When using the reamer, the cutting edge rubs or machines material of the workpiece to be machined. By extending the cutting edge to the outer circumference, the entire machining takes place on the front-side cutting edge itself. No machining occurs in circumferential regions of the reamer, for example at the transitions between the coolant supply channels and the lateral surface portions. As a result, a very high surface quality of the reamed perforated wall is achieved.

One aspect of the invention provides that the cutting region of the reamer has a front side with a front face and a circumferential chamfer towards the lateral surface, wherein the cutting edge abuts the chamfer. With the chamfer, the reamer is guided or centered when it enters into the through-hole to be machined. In particular, the chamfer can be configured so as to define a diameter of the front face, wherein the diameter of the front face is smaller than a diameter of the through-hole to be machined.

In a preferred design variant, the cutting edges are each formed on one side of a chip chamber. The coolant supply channels each open into the chip chambers on sides that are circumferentially opposite the cutting edges. By spatially separating the channel openings and cutting edges, it is prevented that chips pass into the coolant supply channels.

In addition, it can be provided that the chip chambers each have at least one chip guide surface, which is arranged obliquely to a front side of the base body. With the chip guide surface, chips produced at the cutting edge are conveyed in the direction of the axis of rotation of the reamer. A chip discharge can thus be performed in a technically simple manner through the part of the through-hole that is still to be machined. Thus, the perforated walls that have already been machined or reamed are protected against chips.

In a preferred variant, the reamer has a nominal diameter of the machining region between 6 mm to 10 mm, wherein the lateral surface portions separating the chip chambers and the relief-ground regions from one another have a width of between 0.2 mm and 0.3 mm in the axial direction of the base body. It has been shown that a high surface quality can be achieved by reaming these dimensions. At the same time, reamers designed in such a manner are comparatively simple and inexpensive to manufacture.

DESCRIPTION OF THE DRAWINGS

Further features and advantages of the invention result from the following description and from the accompanying drawings, to which reference is made below. The drawings show.

DETAILED DESCRIPTION

Figure 1:
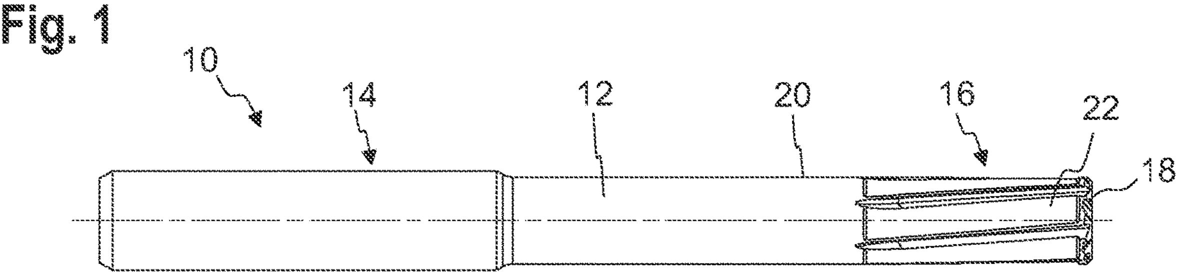
FIG. 1 a side view of a reamer according to the present invention.
Figure 2:
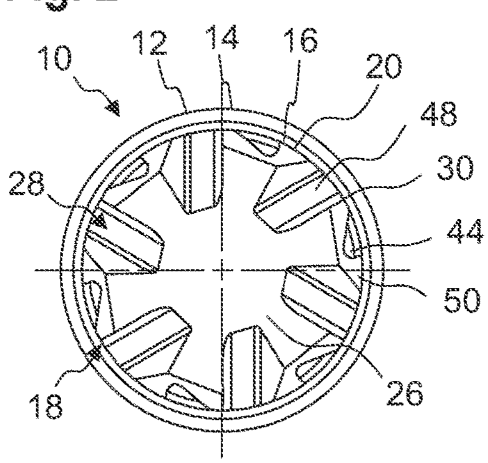
FIG. 2 a front side view of the reamer of FIG. 1.

FIGS. 1 and 2 show an exemplary embodiment of a reamer 10 according to the invention for machining through-holes. The reamer 10 has a base body 12, which comprises a clamping region 14 as well as a front-side machining region 16 with cutting elements 18.

Figure 3:
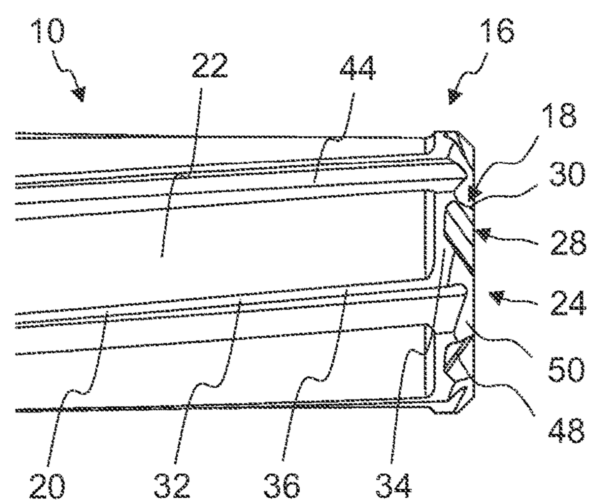
FIG. 3 an enlarged side view of the machining region of the reamer of FIG. 1.
Figure 4:
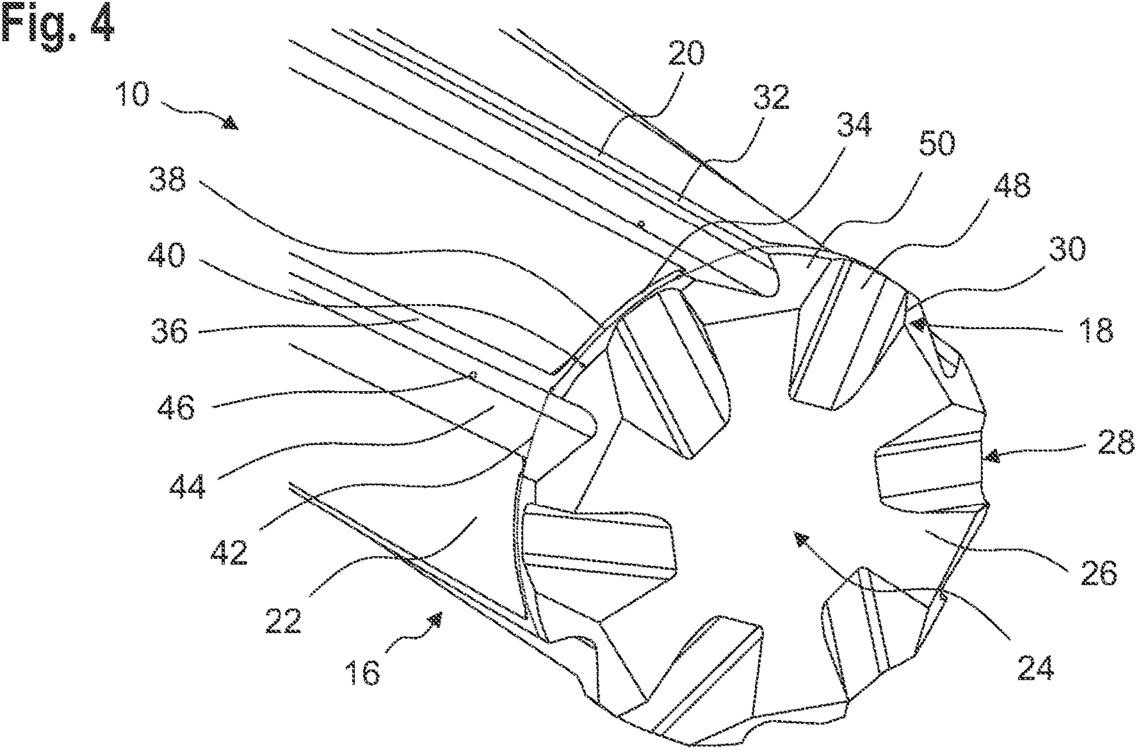
FIG. 4 a three-dimensional representation of the machining region of the reamer of FIG. 1.

FIG. 3 shows the machining region 16 of the reamer 10 in a side view and FIG. 4 in a three-dimensional representation.

The machining region 16 is substantially circularly cylindrical, i.e., its base and its encasement end is a circle cylinder. It has a circular cylindrical lateral surface 20 defining the maximum radial dimension of the reamer 10 in the machining region 16, which is interrupted at several points. In the exemplary embodiment, the nominal diameter of the machining region 16 is 10 mm, which corresponds to the diameter of the circle cylinder enclosed by the lateral surface 20 representing the encasement end. Of course, even smaller or larger nominal diameters are contemplated.

In the exemplary embodiment, a plurality of e.g., six relief-ground regions 22 is introduced into the lateral surface 20 that are evenly distributed along the circumference around the machining region 16 of the reamer 10. Of course, the number of relief-ground regions 22 is not to be understood in a limiting manner. It is conceivable for reamers 10 according to the invention to have more than six or fewer than six relief-ground regions 22. In particular, the number of relief-ground regions 22, the cutting elements 18, as well as further elements of the reamer 10 can be dependent on their nominal diameter.

When using the reamer 10 to machine a through-hole, the relief-ground regions 22 are spaced apart from the circular cylindrical perforated wall. Thus, there is no direct contact between the perforated wall and the reamer 10 in the relief-ground regions 22. As a result, a very high surface quality of the reamed through-hole perforated walls is achieved.

On its front side 24, the reamer 10 has a front face 26.

In the exemplary embodiment, six chip chambers 28 are inserted into the front face 26, each being partially bounded by a cutting edge 30. The cutting edges 30 form the cutting elements 18 and extend up to the outer circumference of the machining region 16 of the reamer 10 on one side of each chip chamber 28.

In the exemplary embodiment, the reamer 10 also has a circumferential chamfer 50 from the front face 26 to the lateral surface 20. The cutting edges 30 respectively abut the chamfer 50.

As shown in FIG. 4, the cutting edges 30 consequently run obliquely to the circumferential direction as well as to the axial direction of the base body 12. This geometric design allows the reamer 10 to be technically simply centered in the through-hole.

In the chip chambers 28, chips are formed on the cutting edges 30 when the reamer 10 is used. In order to prevent the chips from entering the circumferential region of the reamer 10, in particular the relief-ground regions 22, where they could cause scratches or scoring, the chip chambers 28 and adjacent relief-ground regions 22 are separated from one another by lateral surface portions 32 that are a part of the lateral surface 20.

In the exemplary embodiment, the lateral surface portions 32 are each L-shaped.

They have a first leg 34 axially arranged between one of the chip chambers 28 and one of the relief-ground regions 22.

Furthermore, the lateral surface portions 32 each have a second leg 36 circumferentially arranged between two relief-ground regions 22 and extending substantially axially.

The first legs 34 have a length in the circumferential direction of the base body 12 (marked by the first double arrow 38 in FIG. 4) and a width in the axial direction of the base body 12 (marked by the second double arrow 40 in FIG. 4), wherein the length is at least two times greater than the width. As a result, on the one hand, the contact surface between the reamer 10 and the perforated wall is kept low while, on the other hand, an effective barrier is created, which prevents chips from passing from the chip chambers 28 into the relief-ground regions 22. For example, the width of the first legs 34 can be between 0.2 mm and 0.3 mm. It has been found that this range of values is sufficient for effective chip shielding.

In the exemplary embodiment, all first legs 34 are arranged on a line 42 surrounding the base body 12 circumferentially. Here, 65% of the line length of the first legs 34 is occupied. Thus, when the reamer 10 is used, a contact is formed between the lateral surface 20 of the reamer 10 and the perforated wall on 65% of the line length. For example, the line length not occupied by the first legs 34 can be utilized in order to introduce coolant circumferentially into the cutting region, particularly into the chip chambers 28.

For this purpose, the described reamer 10 comprises circumferentially arranged coolant supply channels 44 that extend in the axial direction of the base body 12.

The coolant supply channels 44 are each arranged on a circumferential side of the reamer 10 between one of the second legs 36 and one of the relief-ground regions 22 and are bounded thereby.

In the exemplary embodiment, the reamer 10 has a coolant supply in its interior. Coolant inlets 46 arranged in the coolant supply channels 44 shown in FIG. 4 pass coolant from the base body 12 into the coolant supply channels 44 when the reamer 10 is used.

In order to permit the coolant to be directed into the cutting region, the coolant supply channels 44 each open into the cutting chambers 28. The openings are respectively arranged on sides of the chip chambers 28 opposite the cutting edges 30 in the circumferential direction. The introduction of coolant and machining thus occur on opposite sides of the cutting chambers 28. This prevents or at least reduces the passage of chips through the coolant supply channels 44 from the chip chambers 28.

In the exemplary embodiment, it is provided that chips are discharged through the portion of the through-hole that is still to be reamed. Thus, the perforated walls that have already been machined or reamed are protected against chips.

In order to ensure a directed chip discharge, the reamer 10 has respective chip guide surfaces 48 in the chip chambers 28. These extend from the first legs 34 of the lateral surface portions 32 obliquely towards the front side 24 of the base body 12. The chips produced on the cutting edges 30 are thus guided towards the axis of rotation and, for example, can fall through the through-hole due to gravity.

The invention claimed is:

1. A reamer having a base body comprising:

a clamping region; and a front-facing machining region with cutting elements, wherein the machining region comprises front-facing chip chambers and regions that are relief-ground on a circular cylindrical lateral surface defining the maximum radial dimension of the reamer in the machining region, such that the relief-ground regions are spaced apart from a perforated wall in a circular cylindrical through-hole being machined by the reamer, wherein the chip chambers and adjacent relief-ground regions are separated from one another by lateral surface portions, each chip chamber is bounded by a cutting edge in sections with the cutting edge extending up to the outer circumference, and wherein the machining region has a front side with a front face and a circumferential chamfer towards the lateral surface, wherein the cutting edge abuts the chamfer.

2. The reamer according to claim 1, wherein the lateral surface portions separating the chip chambers and the relief-ground regions from one another are L-shaped.

3. The reamer according to claim 2, wherein the L-shaped lateral surface portions comprise a respective first leg arranged axially between a chip chamber and a relief-ground region and a second leg arranged between two relief-ground regions in the circumferential direction.

4. The reamer according to claim 3, wherein the first legs each have a length in the circumferential direction of the base body and a width in the axial direction of the base body, wherein the length is at least two times greater than the width.

5. The reamer according to claim 3, wherein the first legs are arranged on a line circumferentially surrounding the base body, wherein at least 50% of the line length is occupied by the first legs.

6. The reamer according to claim 3, comprising coolant supply channels which are arranged circumferentially and extend in the axial direction of the base body, each coolant supply channel being bounded on a first circumferential side by the second leg and abutting the relief-ground region on an opposite circumferential side.

7. The reamer according to claim 6, wherein the coolant supply channels each comprise at least one coolant inlet through which coolant is adapted to pass from the base body into the respective coolant supply channel.

8. The reamer according to claim 7, wherein cutting edges are formed on one side of each of the chip chambers, and wherein the coolant supply channels each open into the chip chambers on sides that are circumferentially opposite the cutting edges.

9. The reamer according to claim 6, wherein cutting edges are formed on one side of each of the chip chambers, and wherein the coolant supply channels each open into the chip chambers on sides that are circumferentially opposite the cutting edges.

10. The reamer according to claim 1, wherein the chip chambers each comprise at least one chip guide surface, which is arranged obliquely to a front side of the base body.

11. The reamer according claim 1, wherein a nominal diameter of the machining region is between 6 mm to 10 mm, and wherein the lateral surface portions separating the chip chambers and the relief-ground regions from one another have a width of between 0.2 mm and 0.3 mm in the axial direction of the base body.

12. A reamer, having a base body comprising:

a clamping region; and a front-facing machining region with cutting elements, wherein the machining region comprises front-facing chip chambers and regions that are relief-ground on a circular cylindrical lateral surface defining the maximum radial dimension of the reamer in the machining region, such that the relief-ground regions are spaced apart from a perforated wall in a circular cylindrical through-hole being machined by the reamer, wherein the chip chambers and adjacent relief-ground regions are separated from one another by lateral surface portions, wherein the lateral surface portions comprise a respective first leg arranged axially between a chip chamber and a relief-ground region and a second leg arranged between two relief-ground regions in the circumferential direction, the first legs each have a length in the circumferential direction of the base body and a width in the axial direction of the base body, wherein the length is at least two times greater than the width.

13. The reamer according to claim 12, wherein each chip chamber is bounded by a cutting edge in sections and wherein the cutting edge extends up to the outer circumference.

14. The reamer according to claim 13, wherein the machining region has a front side with a front face and a circumferential chamfer towards the lateral surface, wherein the cutting edge abuts the chamfer.

15. The reamer according to claim 14, wherein cutting edges are formed on one side of each of the chip chambers, and wherein the coolant supply channels each open into the chip chambers on sides that are circumferentially opposite the cutting edges.

16. The reamer according to claim 13, wherein cutting edges are formed on one side of each of the chip chambers, and wherein the coolant supply channels each open into the chip chambers on sides that are circumferentially opposite the cutting edges.

17. The reamer according to claim 12, wherein the lateral surface portions separating the chip chambers and the relief-ground regions from one another are L-shaped.

18. A reamer, having a base body comprising:

a clamping region; and a front-facing machining region with cutting elements, wherein the machining region comprises front-facing chip chambers and regions that are relief-ground on a circular cylindrical lateral surface defining the maximum radial dimension of the reamer in the machining region, such that the relief-ground regions are spaced apart from a perforated wall in a circular cylindrical through-hole being machined by the reamer, the chip chambers and adjacent relief-ground regions are separated from one another by lateral surface portions, the lateral surface portions include a respective first leg arranged axially between a chip chamber and a relief-ground region and a second leg arranged between two relief-ground regions in the circumferential direction, the lateral surface portions separating the chip chambers and the relief-ground regions from one another are L-shaped, each chip chamber is bounded by a cutting edge in sections with the cutting edge extending up to the outer circumference, the machining region has a circumferential chamfer extending from a front face of the machining region to the lateral surface, wherein the cutting edge abuts the chamfer.

* * * * *